UNITED STATES PATENT OFFICE.

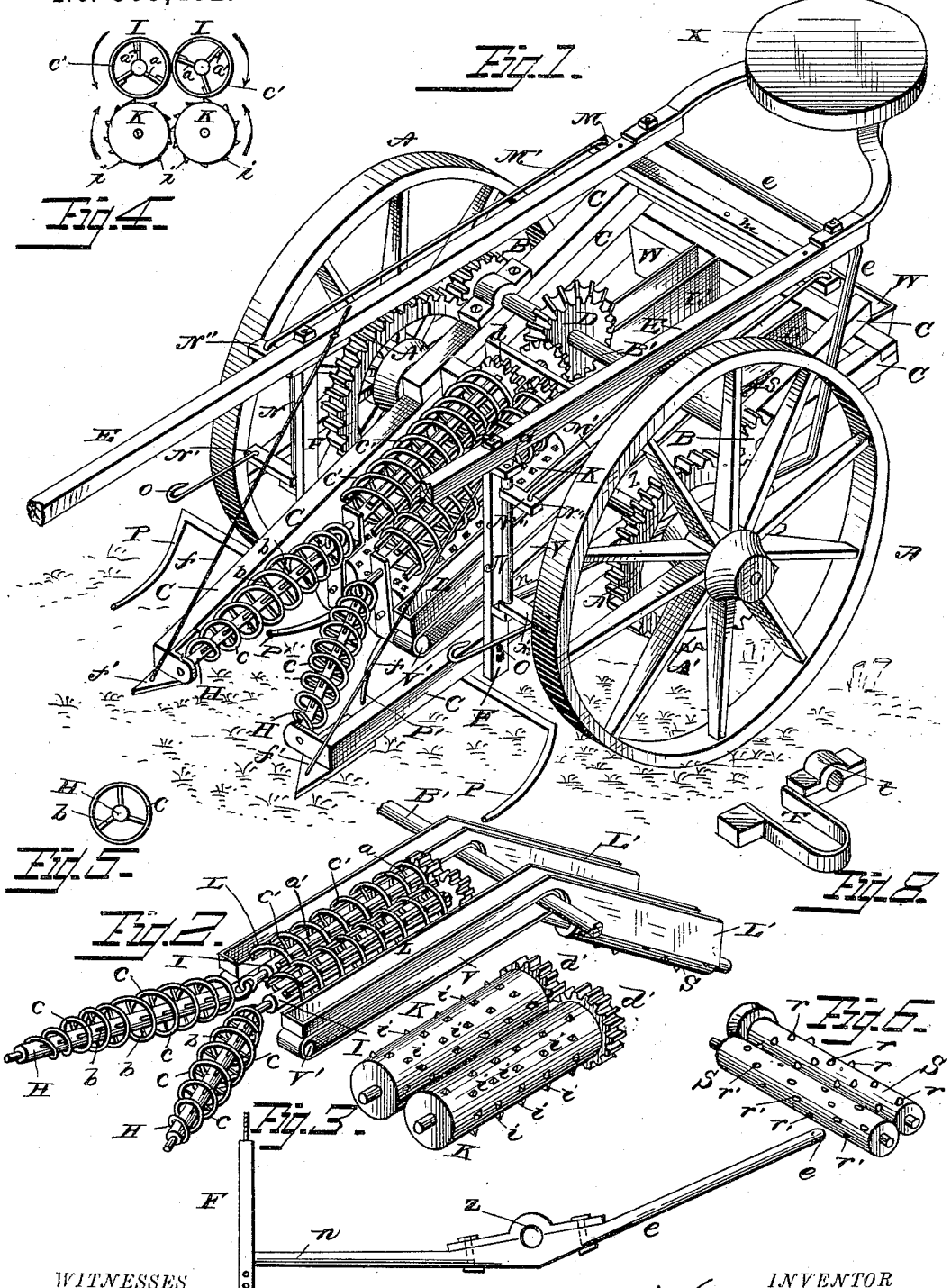

WILLIAM LOGAN HOPPER, OF MONMOUTH, ILLINOIS.

CORN-HARVESTER.

SPECIFICATION forming part of Letters Patent No. 309,462, dated December 16, 1884.

Application filed September 22, 1881. (Model.)

*To all whom it may concern:*

Be it known that I, WILLIAM LOGAN HOPPER, a citizen of the United States, residing at Monmouth, in the county of Warren and State of Illinois, have invented a new and useful Improvement in Corn-Harvesters, of which the following is a specification.

My invention relates to improvements in that class of corn-harvesters which pick the ears from the stalks of standing corn and husk them preparatory to cribbing the same.

The object of my invention is to provide mechanism more effectual than has hitherto been known for gathering up the straggling or down stalks of a row of standing corn and delivering them, with the erect ones, to and conveying them through the picking device of the machine, thereby preventing waste usual to machines now in use, which, by their imperfect action, bend a large portion of the stalks forward, breaking them down without picking the ears, and also fail to get the ears on down or straggling stalks; to provide a better mechanism for picking the ears from the stalks, and also to provide suitable mechanism, working in harmony with said gathering and picking devices, for husking the ears. A further object is to provide a draft-equalizer for corn-harvesters, being so arranged as to distribute the draft equally to the team without lateral pressure, and so constructed as to allow the cornstalks to pass freely and erect between the horses into and through the picking devices of the machine.

My invention consists of the mechanism shown by the accompanying illustrative drawings, and hereinafter more fully explained, and designated by claims, for the accomplishment of the several objects set forth.

In said drawings similar letters of reference indicate like parts in the different figures, of which—

Figure 1 is a perspective of the whole machine embodying my invention. Fig. 2 is a perspective of the stalk-gathering device H H in connection with the picking-rollers I I. It also shows the elevator-troughs L L, one elevator-belt, V, for carrying the picked ears to the husker-troughs L' L', said husker-troughs, part of one husking-roller, S, and part of the driving-shaft B. Fig. 3 represents a pair of toothed rollers for conveying the stalks of corn longitudinally downward during the picking process. Fig. 4 is a cross-sectional view of the picking-rollers I I, shown in Fig. 2, and the toothed rollers K K, shown in Fig. 3, all arranged as in working position, the arrows indicating the direction of motion, respectively, of each. Fig. 5 is a cross-sectional view of one of the stalk-gathering screws H H, shown in Fig. 2. Fig. 6 is a detached view of one pair of the husking-rollers. Fig. 7 represents a side view of a combined draft and tongue supporting bar and tongue-supporting standards F attached thereto; and Fig. 8 is a detached view of a spring combined with a journal-box, used to give elasticity to both the toothed and husking rollers.

As a further description, using reference-letters, A A are the traveling and main drive wheels of the machine, to which are attached the cog-wheels A' A', which gear with the pinions B B on the ends of the drive-shaft B'. On the shaft B' is also a bevel-wheel, D, which, by having suitable connecting-gearing, arranged in any of the known ways of the art, drives the toothed rollers K K, the picker-rollers I I, and the husker-rollers S S. The gathering-screws H H derive their motion from the picker-rollers I I, being connected to them by universal joints or loop-connections.

As indicated by the arrows in Fig. 4, the picking-rollers I I revolve outwardly, and the toothed rollers K K revolve inwardly, each pair being geared together by means of the cog-wheels *d d* and *d' d'*, respectively.

The stalk-gathering screws H H consist of a pair of shafts provided with radiating arms *b*, upon the outer ends of which are fastened spirally-coiled rods which constitute screw-threads. Said screws are enlarged near their upper ends and gradually diminished both ways, for the purpose of the better confining straggling stalks of corn between their enlarged parts while feeding them to the picking device. They are also matched in pairs— one being a right and the other a left hand screw—by having their coiled rods or threads *c* winding in opposite directions. They are arranged forward of the picking device, with their forward ends deflecting outward and downward, and are coupled to the shafts of the picker-rollers I I, as above described. Their forward ends are pivoted in supports attached to the frame-pieces C C. Said screws having a rapid motion given to them, and a fast pitch, serve to collect and raise the down and leaning stalks, and feed them, with the erect ones, to the picking device. The connections of said screws H H with said picker-rollers I I are not opposite each other, but in a jogged position, so that the thread of the longer screw will carry the stalks so as to be caught by the thread of the longer picker-roller, thereby preventing clogging at said coupling. The picker-rollers I I each consist of a shaft having three parallel rows of radiating arms, $a$, arranged at equal distances around said shafts, with bars $a'$ extending full length of said rollers, and fastened to the outer ends and forward sides of said arms $a'$, (as regards the respective movements of said rollers,) and a spirally-coiled rod $e'$ wound around outside of the bars $a'$, constituting a screw-thread. Said rollers, like the screws H H, are in pairs, having their screw-threads $e'$ running in opposite directions, the one from the other, thereby constituting one right-hand and one left-hand screw. Said spiral threads, by means of the outward rotation of said rollers, feed and carry the stalks of corn back in the picking device, while they are also being carried lengthwise downward between and by the action of the toothed rollers K K, in which operation the ears of corn are plucked from the stalks by means of the bars $a'$ of the rollers I I striking them in their upward movement, thereby knocking them off of the stalks and into the elevator-troughs L L, said troughs being placed one on each side of said rollers. The rollers K K are arranged directly under the rollers I I, and are provided with short sharp-pointed teeth $i$, rigidly fastened on their peripheries, and arranged in parallel rows, the teeth of one row dividing the spaces of the adjacent rows, which rollers, as they are made to revolve inwardly, firmly grasp the stalks by means of their teeth piercing through both the sheathing and hard shell or rind, so as to prevent slipping, (which is difficult to overcome by other devices,) and thus with a certainty carry said stalks rapidly lengthwise downward while the machine is passing over them.

I am aware that corn-harvesters have been made having two hollow cylinders arranged parallel with each other in a fore-and-aft inclining position, said cylinders being provided with a series of adjustable bars longitudinally arranged inside of them, and having outward-radiating teeth attached to said bars, which pass through openings in the rims of said cylinders, the adjustments of said bars being controlled by means of rubber bands and cams inside of said cylinders. Said cylinders are, however, designed, and used in combination with other elements thereto belonging, for husking corn, and cannot be successfully used as a downward-feeding device for carrying the stalks endwise downward from the picking device with regularity and proper force to jerk the ears from the stalks by means of their combined operation with that of said picking device, which is the object and required work of the rollers K in this my invention, thus counteracting the upward pressure produced by the action of the said picking device, which is arranged over them, and thus plucking the ears from the stalks (preparatory to husking) before reaching said rollers. A prominent cause of the defectiveness of said cylinders for said purpose is that the teeth so attached to adjustable bars lack rigidity sufficient for piercing through the hard shell-like rind of dry cornstalks sufficient to prevent slipping, and, owing to the necessary divergence of said teeth from their point of attachment to the different bars inside of said cylinders, (by giving room for the adjustment of the bars,) would preclude the possibility of arranging them sufficiently close to accomplish the desired object, as it will require the constant effect of at least one tooth to the stalk to properly force them downward, unless said cylinders should be worked so close together as to do the work by means of friction, which would so crush the stalks as to cause them to fall on the ground, thereby destroying subsequent pasturage.

Other corn-harvesters have rollers arranged in a vertical position, designed, in combination with other mechanism, for picking the ears off standing stalks of corn by a pinching process, as said stalks are made to pass transversely between them; but their combination and arrangement could not serve the purpose above described of the said rollers K in my invention. The said rollers I I and K K are geared together by cog-wheels $d\,d$ and $d'\,d'$. As a support to the outer ends of down or reclining stalks as they are being raised by the gathering-screws H H, the rods $f\,f$ are provided. They extend from the pointed projections $f'$ $f'$ of the forward bearings of said gathering-screws, and are supported at top by staples in the tongues E E, or otherwise. (Part of said tongues are represented in the drawings as being broken off.) Said rods also guide the stalks properly between the said tongues. The double or two tongues are provided, so that they will straddle the row of standing corn without coming in contact with it. They are also better adapted for the connections of the adjusting device and draft-equalizer of the machine than if but one tongue only be used. Said tongues are coupled together at their rear ends by the bar $m$ or other analogous means. They rest upon and are supported by the rear extension of the bent bar $e$, which bar is pivoted to the axle by bearings, as shown at $z$, Fig. 7. It also has forward extensions, $n\,n$, one at each side of the machine, which extensions constitute the principal draft-bars. Standards F F are also connected to the forward ends of the bars $n\,n$. They serve to form additional supports to the tongues E E, and are adjustably connected with the frame-pieces C C by means of a series of holes in the lower ends of each, through which, as well as through holes also in said frame-pieces, pins or bolts are inserted, as a means of coupling, to secure them in the required position, thereby providing for a vertical adjustment of the forward part of the machine by changing the coupling pins or bolts to proper holes in said standards, causing the machine to oscillate on the axle, (see Fig. 7,) so as to adjust it suitably for different heights and conditions of corn. The curved bars or rakes P P, attached to the side frame-pieces, C C, (one on each side of the machine,) are for the purpose of straightening around down stalks, such as may be lying crosswise of the row, preparatory to or suitable for the action of the gathering-screws H H. The curved bars or guides P' P', attached to the forward ends of the picking-roller supports, serve as gatherers and guides, to cause the stalks to properly enter between the rollers of said picking devices. The endless elevator-belts V, running in the troughs L L, and constituting the bottoms of the same, run over and are carried by the shaft B' and pulleys V', and serve to carry the ears of corn dropped on them by the picking devices to and deposit them on the upper ends of the husking-rollers S S'. Said rollers being arranged in pairs, having a rearward declination in the troughs L' L', constitute the bottoms of said troughs, and are constructed as shown in Fig. 3, one of each pair having short cone-shaped teeth, $r$, arranged spirally in rows, with the other ones respectively provided with corresponding rows of holes or sockets, $r'$, all so arranged that the teeth of one will take into the sockets of the other by rotating them inwardly, thereby catching the husks and stripping them from the ears of corn as they slide lengthwise down over them. The husked ears of corn pass from the troughs L' L' into a receptacle, W, in rear. A draft-equalizer is provided, consisting of the double-tree M, connecting-rods M', upright shafts N, each of the latter having lateral projecting arms N' and N'', and the hooks $o$, all arranged as follows: The double-tree M is pivoted at its middle to the tongue connecting cross-bar $m$, and has its ends coupled by rods M', respectively, to the arms N'' of the upright shafts N, which shafts are pivoted at their lower ends in the lugs on the forward ends of the draft-bars $n\ n$, and their upper ends in outward-projecting arms or lugs attached to the upper ends of the standards F F. To said shafts N are also rigidly fastened, at their lower ends, outward-projecting arms N', to the outer ends of which are attached the hitching-hooks $o\ o$, thus constituting an equalizer with its pivotal connections elevated above interference by cornstalks, and at the same time having the draft directly on a line with and connected to the axle of the machine.

X is a driver's seat mounted on the tongues E E.

In order to give elastic pressure to the rollers K K and the husking-rollers S S, so that one of each pair will yield from the other in adjusting to inequalities of feed, springs, as shown at T, Fig. 8, are attached to a journal-box, $t$, of one roller of each of said pairs.

Having thus fully described my invention, so as to enable others to understand the same, what I claim as new, and desire to secure by Letters Patent, is—

1. In combination with the drive-wheels A A, cog-wheels A' A', and the axle of the machine, the frame-work C C C C, shaft B', pinions B B, bevel-wheel D, gathering-screws H H, guide-rods $f f$, picker-rollers I I, toothed rollers K K, elevators V V, and husker-rollers S S, all adjustably arranged by means of the standards F F, supporting-bars $e\ e$, draft-bars $n\ n$, and tongues E E, substantially as herein shown, for the purposes specified.

2. In combination with the picking-rollers I I, arranged as described, the rollers K K, placed parallel with and directly under said picking-rollers, said rollers K K having short sharp-pointed teeth rigidly fixed to the peripheries in close proximity to each other, and means to revolve the rollers inward for the purpose of forcibly feeding the cornstalks lengthwise downward between said picking-rollers, substantially as shown, for the purpose specified.

3. In combination with the forward projections $f''\ f''$ from the frame-pieces C C and the tongues E E, the guide-rods $f f$, substantially as herein shown, for the purposes specified.

4. In combination with the draft-bars $n\ n$, frame-pieces C C, and tongues E E, the standards F F, provided with graduating holes for vertically adjusting the machine, substantially as herein shown and specified.

5. For a corn-harvester, in combination with the tongue-connecting bar $m$, draft-bars $n\ n$, and standards F F, the draft-equalizer consisting of the elevated double-tree M, connecting-rods M' M', upright shafts N N, arms N' N' and N'' N'', and the hooks $o\ o$, all substantially arranged as herein shown, for the purpose specified.

WILLIAM LOGAN HOPPER.

Witnesses:
J. L. DRYDEN,
G. A. SAMSON.